(12) United States Patent
Löhken et al.

(10) Patent No.: US 10,888,161 B2
(45) Date of Patent: Jan. 12, 2021

(54) SEATING DEVICE COMPRISING SEATING PARAMETER DETECTION

(71) Applicant: Stabilus GmbH, Koblenz (DE)

(72) Inventors: Lars Löhken, Linz am Rhein (DE); Markus Müller, Koblenz (DE); Fred Häring, Neuwied (DE); Ulrich Probst, Hillscheid (DE); Raphael Piroth, Koblenz (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 15/978,335

(22) Filed: May 14, 2018

(65) Prior Publication Data

US 2018/0332966 A1    Nov. 22, 2018

(30) Foreign Application Priority Data

May 16, 2017    (DE) .................. 10 2017 208 242

(51) Int. Cl.
    *A47C 1/024*      (2006.01)
    *A47C 7/62*       (2006.01)
    *A47C 1/032*      (2006.01)
    *B60N 2/00*       (2006.01)
    *A47C 31/12*      (2006.01)
    *A47C 7/72*       (2006.01)
    *B60N 2/02*       (2006.01)

(52) U.S. Cl.
    CPC ........ *A47C 1/0242* (2013.01); *A47C 1/03211* (2013.01); *A47C 1/03255* (2013.01); *A47C 7/62* (2013.01); *A47C 7/72* (2013.01); *A47C 31/126* (2013.01); *B60N 2/002* (2013.01); *B60N 2002/0268* (2013.01)

(58) Field of Classification Search
    CPC .................................................. A47C 1/0242
    See application file for complete search history.

(56) References Cited

U.S. PATENT DOCUMENTS

| 8,024,202 B2* | 9/2011 | Carroll | ............... | G06Q 50/24 |
| | | | | 702/150 |
| 2004/0010328 A1* | 1/2004 | Carson | ............... | G06Q 10/00 |
| | | | | 700/90 |

(Continued)

OTHER PUBLICATIONS

Martins, L., et al.; "Intelligent Chair Sensor-Classification and Correction of Sitting Posture"; In: "IFMBE proceedings (International Federation for Medical and Biological Engineering)", Sep. 28, 2013.

(Continued)

*Primary Examiner* — Santosh R Poudel
(74) *Attorney, Agent, or Firm* — Rankin, Hill & Clark LLP

(57) ABSTRACT

An electrically adjustable seating device includes at least one sensor element, a processor, a memory unit and at least one electromechanical actuator. The at least one sensor element is designed to detect predetermined seating parameter data relating to a person sitting on the seating device and to transmit the data to the processor. The processor is designed to determine person parameter data, relating to the person, from the seating parameter data, to extract control data, which are associated with the person parameter data, from the memory unit and to control the at least one electromechanical actuator on the basis of the control data.

10 Claims, 2 Drawing Sheets

(56) References Cited

U.S. PATENT DOCUMENTS

| | | | |
|---|---|---|---|
| 2005/0078340 A1* | 4/2005 | Kato | H04N 1/00795 |
| | | | 358/474 |
| 2006/0226670 A1* | 10/2006 | Bernstein | B60N 2/14 |
| | | | 296/24.39 |
| 2008/0046427 A1* | 2/2008 | Lee | G06F 16/2471 |
| 2009/0084609 A1* | 4/2009 | Skinner | A61B 5/1115 |
| | | | 177/144 |
| 2009/0273441 A1 | 11/2009 | Mukherjee | |
| 2010/0198374 A1* | 8/2010 | Carson | G16H 20/30 |
| | | | 700/90 |
| 2011/0170945 A1* | 7/2011 | Gagnon | A47C 1/12 |
| | | | 403/122 |
| 2013/0113254 A1* | 5/2013 | Augustat | A47C 3/20 |
| | | | 297/313 |
| 2015/0142381 A1* | 5/2015 | Fitzsimmons | A47C 7/006 |
| | | | 702/166 |
| 2015/0302168 A1* | 10/2015 | De Sapio | G16H 50/50 |
| | | | 703/11 |
| 2015/0366350 A1 | 12/2015 | Di Censo | |
| 2016/0088948 A1* | 3/2016 | Boduk | A47C 7/62 |
| | | | 700/275 |
| 2016/0143593 A1* | 5/2016 | Fu | A61B 5/0022 |
| | | | 600/595 |
| 2018/0134188 A1* | 5/2018 | Niitsuma | B60N 2/888 |
| 2019/0175076 A1* | 6/2019 | Lustig | A47C 7/72 |

OTHER PUBLICATIONS

European Search Report filed in EP 18172178 dated Aug. 16, 2018.

* cited by examiner

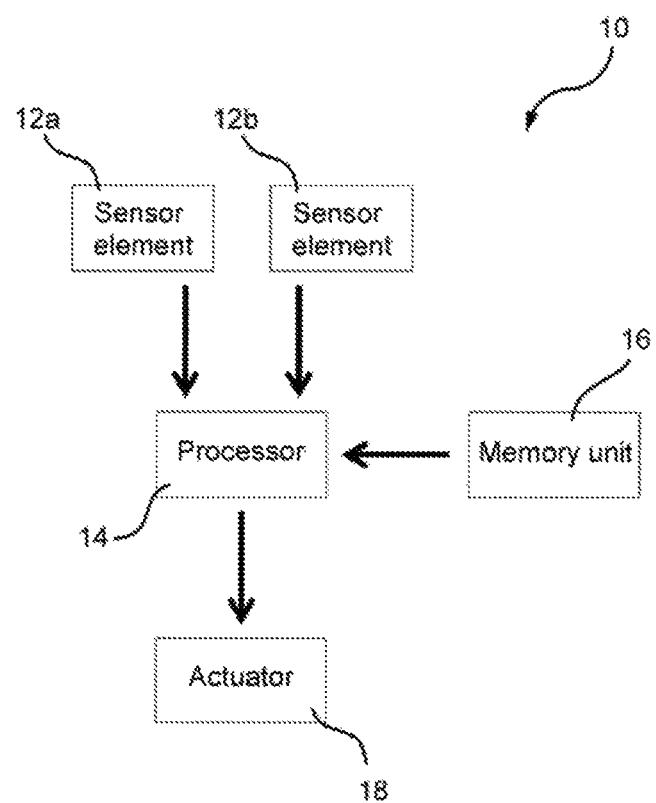

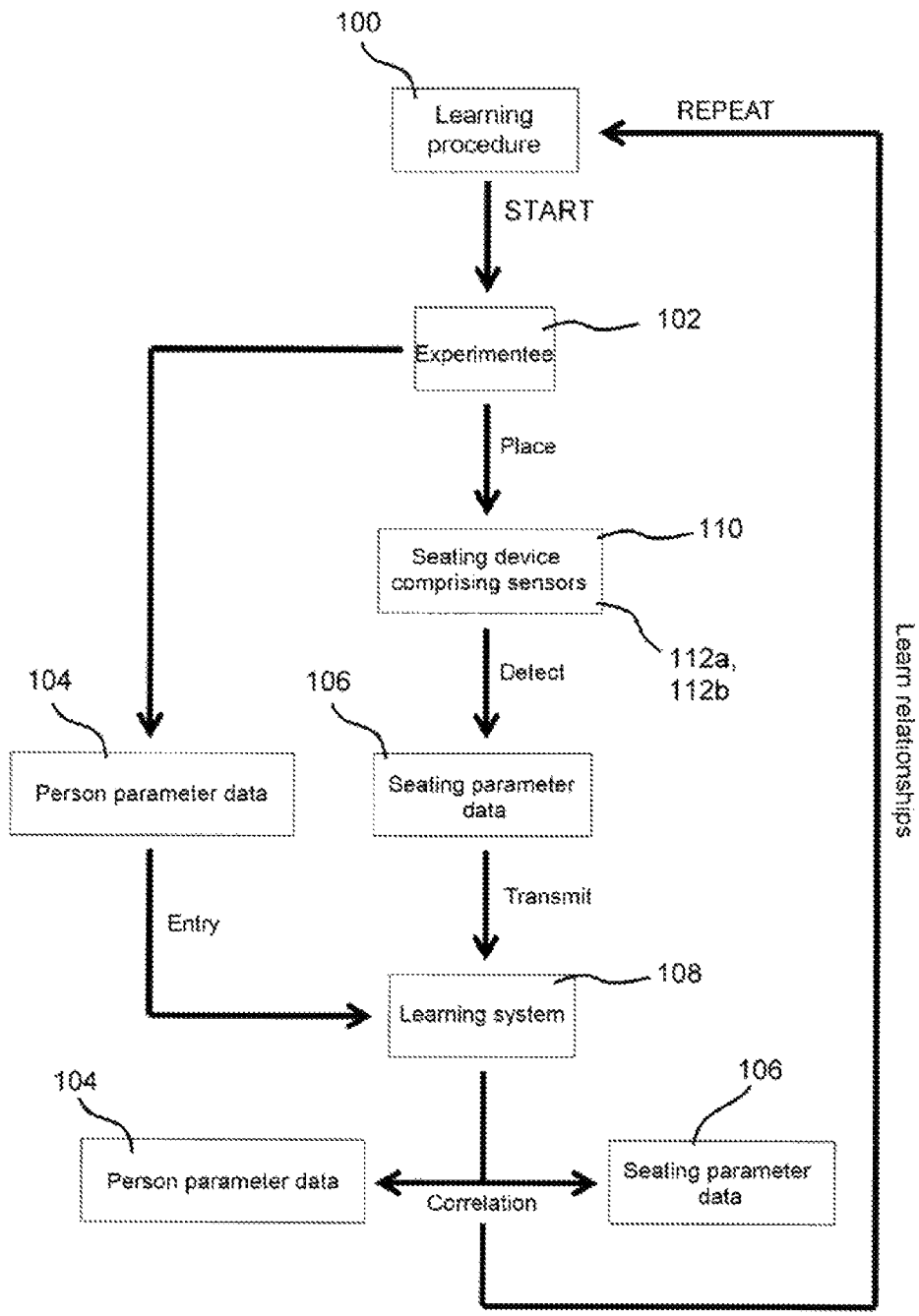

SEATING DEVICE COMPRISING SEATING PARAMETER DETECTION

The present invention relates to an electrically adjustable seating device, comprising at least one sensor element, a processor, a memory unit and at least one electromechanical actuator, the at least one sensor element being designed to detect predetermined seating parameter data relating to a person sitting on the seating device and to transmit said data to the processor. The present invention also relates to a corresponding method.

When adjusting a seat, in particular office chairs but also other seat assemblies or devices in general, it is largely advantageous for health reasons to set an ergonomic position for a person sitting on the seat or chair. In this case, it is substantially easier to choose an incorrect setting than it is to choose a correct or ergonomically advantageous setting for several reasons.

Conventional office chairs can be manually adjusted by means of various rotary and lever mechanisms that are generally arranged beneath the seat. Depending on the model, these adjustment devices make it possible to set the seat height, the angle of inclination of the backrest, the backrest pretension, the angle of inclination of the seat, the armrest height and so on.

Seat arrangements that are already known from the automotive industry can be electrically adjusted and can also be customised to a specific user.

Operating and display elements, for example steering wheels, yokes/joysticks and dashboards are usually mechanically, and in some cases electrically, adjusted. Rarely are these adapted to the standard user setting by means of user recognition (for example by means of the ignition key).

Since the adjustment levers are usually arranged beneath the chair, it is incredibly uncomfortable for the user to find the correct lever for the desired adjustment. In addition, this type of adjustment requires the user to hold a forced posture, which does not allow them to receive immediate feedback as to whether the selected setting is optimal or comfortable. Iterative, uncomfortable and sometimes time-consuming adjustment and readjustment of the seat is therefore sometimes required. Unergonomic settings are often tolerated as a result.

Furthermore, most users do not know which chair setting is ergonomically advantageous, which can lead to unfavourable settings. In modern workplaces or conference rooms, for example, different users often also use the same chair, thus involving frequent adaptation of the setting.

Even with a memory function, electrical automotive seat assemblies are unable to react to an unknown user, which would be advantageous for pool vehicles or for car sharing services. In addition, these systems cannot provide user-specific assistance for setting a position that is as ergonomic as possible.

In light of this, one object of the present invention is to provide an electrically adjustable seating device and a method for setting an electrically adjustable seating device, the correct seated position, in particular with regard to ergonomics, being set automatically when a person sits on the seating device.

This object is achieved by an electrically adjustable seating device comprising at least one sensor element, a processor, a memory unit and at least one electromechanical actuator, the at least one sensor element being designed to detect predetermined seating parameter data relating to a person sitting on the seating device and to transmit said data to the processor, the processor being designed to determine person parameter data, relating to the person, from the seating parameter data, to extract control data, which are associated with the person parameter data, from the memory unit, and to control the at least one electromechanical actuator on the basis of the control data.

By means of the actuator system (at least one electromechanical actuator) arranged in the seating device, the seating device can be adjusted automatically into an ergonomic position for the user of said seating device. Since, as previously mentioned, it is usually extremely uncomfortable to operate conventional seat-adjustment systems and most users do not know which seat setting is ergonomically advantageous either, the structure of the seating device according to the present invention allows the user to sit in a healthier position as a result of an ergonomic seated position, allowing the user to sit for longer without taking breaks as they are less fatigued and more available due to fewer absences resulting from postural damage, in particular in the workplace. This also directly provides every user with an optimum seated position, in particular in heavily frequented places such as conference rooms, waiting rooms and lounges. In an equally positive way, it is greatly beneficial to use the seating device in workplaces where workers sit for an extremely long time, and which therefore have high ergonomic requirements (driver's seats of commercial vehicles, pilot seats or office furniture).

The at least one electromechanical actuator can preferably control at least one position parameter of the seating device. Position parameters of the seating device can be one or more of the following parameters: the seat height, angle of inclination of the backrest, backrest pretension, angle of inclination of the seat, seat depth or armrest height. When correctly set, all of these position parameters ensure that the user is sat in an ergonomic, and therefore healthy, position.

The person parameter data relating to the person, which data are determined from the seating parameter data, can comprise data relating to at least one feature selected from: the height, weight, proportions and sex of the person in particular. Said data make it possible to calculate an optimum seat setting for the person and ensures that they are sitting on the seating device in an ergonomic and healthy position.

In a particularly preferred embodiment of the present invention, the seating device can be an office chair. The problems of the prior art outlined above are particularly common in everyday office life, which is why use of the seating device of the present invention as an office chair is considered to be particularly advantageous. Furthermore, in addition to use as an office chair, there are several other fields of application for the seating device of the present invention (for example in the automotive industry).

According to a preferred embodiment of the present invention, the seating device can comprise a plurality of sensor elements, which can be arranged in a seat and/or a backrest of the seating device in particular. The sensor elements in the seat and the backrest of the seating device can record important parameters for determining an ergonomic seated position, and forward them to the processor. Person parameter data such as the height, weight, proportions and sex of the user, can then be derived from the measured data evaluated by the processor, and an advantageous chair setting can thus be calculated.

In another advantageous embodiment, the processor can also be designed to control settings of devices arranged in the area around the seating device. Such devices may be furniture and operating or display elements in the work environment, for example, such that the entire workplace can be automatically ergonomically adapted to the particular user in each case, such as to commercial vehicle drivers, car drivers and passengers, pilots, workers and so on. Furthermore, furniture, operating or display elements that can adapt to the user and their seated position can be beneficial in the work environment in particular for health, ergonomic and comfort reasons. One embodiment of the present invention therefore proposes linking these objects to the adjustment of the chair and thus also automating the process of adjusting said chair.

It is also proposed in particular for both communication and the transmission of commands between the seating device and other adjustable objects arranged around said device to be possible (for example the dashboard, table, display screen or operating instruments). Possible fields of application for this embodiment are in offices, in which the height of a desk can be adjusted and the height and distance of a screen can be adjusted, for example, in passenger compartments, in which the height and inclination of the steering wheel can be adjusted, or in airplanes, in which various positions can be set for instruments.

In addition, the object of the invention set out above is achieved by a method for setting an electrically adjustable seating device, comprising the following steps:
 a) detecting predetermined seating parameter data relating to a person sitting on the seating device by means of at least one sensor element, and
 b) transmitting the seating parameter data to a processor by means of the at least one sensor element, the method also comprising the following steps:
 c) determining, from the seating parameter data, person parameter data relating to the person by means of the processor,
 d) extracting control data, which are associated with the person parameter data, from a memory unit by means of the processor, and
 e) controlling at least one electromechanical actuator on the basis of the control data by means of the processor.

This method therefore makes it possible to automatically adjust the seat such that it is in an ergonomic position for the user of the seating device by means of the actuator system (at least one electromechanical actuator) arranged in the seating device. Since, as mentioned above, it is often extremely uncomfortable to operate conventional seat-adjustment systems and most users do not know which seat setting is ergonomically advantageous either, the method for adjusting the seating device allows the user to sit in a healthier position as a result of an ergonomic seated position, allowing the user to sit for longer without taking breaks as they are less fatigued and more available due to fewer absences resulting from postural damage, in particular in the workplace. This also directly provides every user with an optimum seated position, in particular in heavily frequented places such as conference rooms, waiting rooms and lounges. In an equally positive way, it is greatly beneficial to apply the method to workplaces where workers sit for an extremely long time, and which therefore have high ergonomic requirements (driver's seats of commercial vehicles, pilot seats or office furniture).

The method can particularly preferably also comprise the following step, which precedes step a):
 carrying out a learning process, which involves repeatedly carrying out a learning procedure using a plurality of experimentees, the following steps being carried out in each learning procedure using one of the plurality of experimentees:
   placing the experimentee on a seating device,
   entering predetermined person parameters relating to the experimentee into a learning system,
   detecting predetermined seating parameter data relating to the experimentee by means of at least one sensor element,
   transmitting the seating parameter data to the learning system, and
   establishing a correlation between the seating parameter data and the person parameter data relating to the experimentee by means of the learning system,
 the processor determining, in step c), the person parameter data, which relate to the person, from the seating parameter data using the learning system.

The learning system is therefore a machine learning algorithm, which can be used to control the electrical adjustment of the seating device. It should be noted that the learning procedure or the repeated learning procedure using the seating device comprising the at least one sensor element, the processor, the memory unit and the electromechanical actuator, can be carried out from method steps a) to e); however, said learning process or procedure can alternatively also be carried out using a different seating device, which is advantageously but not necessarily a seating device of the same type and can be connected to an external processor, for example.

The at least one electromechanical actuator can preferably control at least one position parameter of the seating device. Position parameters of the seating device can be the seat height, the angle of inclination of the backrest, the backrest pretension, the angle of inclination of the seat or the armrest height, for example. When correctly set, all of these position parameters ensure that the user is sat in an ergonomic, and therefore healthy, position.

In particular, the person parameter data relating to the person, which data are determined from the seating parameter data, can comprise data relating to at least one feature selected from: the height, weight, proportions and sex of the person. Said data make it possible to calculate an optimum seat setting for the person and to ensure that they are sitting on the seating device in an ergonomic and healthy position.

In a particularly preferred embodiment of the present invention, the seating device can be an office chair. The problems of the prior art outlined above are particularly common in everyday office life, which is why use of the seating device of the present invention as an office chair is considered to be particularly advantageous. Furthermore, in addition to use as an office chair, there are several other fields of application for the seating device of the present invention (for example in the automotive industry).

According to a preferred embodiment of the present invention, the seating device can comprise a plurality of sensor elements, which can be arranged in a seat and/or a backrest of the seating device in particular. The sensor elements in the seat and the backrest of the seating device can record important parameters for determining an ergonomic seated position, and can forward them to the processor. The measured data evaluated by the processor can then be used to deduce person parameter data, such as the height, weight, proportions and sex of the user, and an advantageous chair setting can therefore be calculated.

In another advantageous embodiment, the processor can control settings of devices arranged in the area around the seating device. Such devices may be furniture and operating or display elements in the work environment, for example, and therefore the entire workplace can automatically ergonomically adapt to the particular user in each case, such as commercial vehicle drivers, car drivers and passengers, pilots, workers, and so on. Furthermore, furniture, operating or display elements that can adapt to the user and their seated position can be beneficial in the work environment in particular for health, ergonomic and comfort reasons. One embodiment of the present invention therefore proposes linking these objects to the adjustment of the chair and to thus also automating the process of adjusting said chair. This can also include the adjustment of furniture and operating or display elements in the work environment by means of the algorithm and using the knowledge from the sensor system in the seat, and therefore the workplace can automatically and ergonomically adapt to the particular user in each case.

The invention will be explained in more detail in the following on the basis of preferred embodiments and with reference to the accompanying drawings, in which FIG. 1 is a block diagram schematically showing the structure of a seating device according to one embodiment of the present invention, and FIG. 2 is a block diagram schematically showing the execution of a learning process using a plurality of experimentees, in which a learning procedure is repeatedly carried out using one of the plurality of experimentees in each case.

The block diagram shown in FIG. 1 is a schematic view of the structure of an electrically adjustable seating device 10. In the embodiment shown in FIG. 1, the seating device comprises two sensor elements 12a and 12b. For example, one sensor element 12a can be arranged in a seat (not shown) of the seating device 10 and the other sensor element 12b can be arranged in a backrest (not shown) of the seating device 10. The sensor elements 12a, 12b detect predetermined seating parameter data relating to a person sitting on the seating device 10. Furthermore, the seating device 10 comprises a processor 14, to which the sensor elements 12a, 12b transmit the seating parameter data relating to the person. The processor 14 uses the seating parameter data to determine person parameter data relating to the person, in particular data relating to the height, weight, proportions and sex of the person. The seating device 10 also comprises a memory unit 16, from which the processor 14 extracts control data associated with the person parameter data. In addition, an electromechanical actuator 18 is provided, which controls the processor 14 on the basis of the control data extracted from the memory unit 16.

The learning process shown in FIG. 2 by means of a block diagram allows the processor 14 of the seating device 10 from FIG. 1 to automatically detect the person parameter data relating to the person sitting on the seating device 10. In this case, the learning process is usually not carried out multiple times at the final point of use of the seating device (for example in an office or automobile), but at a different point, such as in a factory or laboratory under test conditions. The results obtained are input into the software of the processor 14 of the seating device 10 once the test/learning process has finished.

The learning process comprises a plurality of repeating learning procedures 100 using a plurality of experimentees. In each learning procedure 100, one experimentee 102 is placed on a seating device 110, which may also be the seating device 10 from FIG. 1 but is preferably a different, seating device of the same type, or a prototype of a seating device of the same type. The optimum seat settings for various groups of people can therefore be determined even before potential mass production of a piece of seating furniture or the like.

The seating device is provided with sensors 112a, 112b, which can in turn be the sensor elements 12a and 12b in FIG. 1, but are advantageously of the same type, or are at least similar sensor elements. Either before or after the experimentee 102 has sat down on the seating device 110, predetermined person parameter data 104 relating to the experimentee 102 is entered into a learning system 108. The person parameter data 104 can comprise data relating to at least one of the following: the height, weight, proportions and sex of the experimentee 102. The sensors 112a and 112b detect predetermined seating parameter data 106 relating to the experimentee 102 and transmit said data to the learning system 108. The learning system 108 then establishes a correlation between the seating parameter data 106 detected and the person parameter data 104 relating to the experimentee 102 that is entered, after which the learning procedure 100 is repeated using the next experimentee. By repeating the learning procedure many times, the learning system 108 learns the relationships between person parameter data 104 and seating parameter data 106 until the learning system 108 can use the seating parameter data 106 detected by the sensors 112a, 112b and a learning algorithm to conclude what person parameter data 104 the experimentee 102 sitting on the seating device 110 has, without the corresponding person parameter data 104 of said experimentee having been entered into the learning system beforehand. This learnt algorithm is then appropriated for a computing means of a mass-produced product, for example the processor 14 of the seating device 10 from FIG. 1, once the learning process has ended, as a result of which said processor can determine the person parameter data relating to a person from the seating parameter data detected without having to enter said data beforehand, and can automatically adjust the seating device or the like to the ergonomically correct position for different people.

It should be noted that the invention is not limited to the embodiments described and a different structure of the seating device 10 or a different sequence of the method steps of the learning procedure 100 are also possible within the context of the invention. In particular, the arrangement and number of sensor elements 12a, 12b; 112a, 112b and of the at least one actuator 18 can vary.

The invention claimed is:

1. An electrically adjustable seating device, comprising:
   at least one sensor element,
   a processor,
   a memory unit, and
   at least one electromechanical actuator,
   the at least one sensor element being designed to detect predetermined first seating parameter data relating to a person sitting on the seating device and to transmit said data to the processor, wherein the processor is designed to
   determine predetermined first person parameter data, relating to the person, from the predetermined first seating parameter data, by running a learnt algorithm based on a correlation established by a learning system between predetermined second seating parameter data and predetermined second person parameter data both of which are derived from a plurality of experimentees other than the person placed on a test seating device of the same type as the seating device, wherein the learnt algorithm allows the processor to determine the predetermined first person parameter data without having to enter the predetermined first person parameter data into the processor beforehand,
   extract control data, which are associated with the first person parameter data, from the memory unit, and control the at least one electromechanical actuator on the basis of the control data such that every user directly is provided with an optimum seated position, wherein the first person parameter data relating to the person, which data are determined from the predetermined first seating parameter data, comprise data including at least one of proportions and sex of the person.

2. The seating device according to claim 1, wherein the at least one electromechanical actuator controls at least one position parameter of the seating device.

3. The seating device according to claim 1, wherein the seating device is an office chair.

4. The seating device according to claim 1, wherein the seating device comprises a plurality of sensor elements, which are arranged in a seat and/or a backrest of the seating device in particular.

5. The seating device according to claim 1, wherein the processor is also designed to control settings of devices arranged in the area surrounding the seating device, wherein the devices are adapted to the person sitting on the seating device.

6. A method for setting an electrically adjustable seating device, comprising:
   a) carrying out a learning process, which involves repeatedly carrying out a learning procedure using a plurality of experimentees placed on a test seating device, wherein each learning procedure for each experimentee includes the following steps:
      placing the experimentee on the test seating device,
      entering predetermined experimentee person parameter data relating to the experimentee into a learning system,
      detecting predetermined experimentee seating parameter data relating to the experimentee by at least one sensor element, and
      transmitting the predetermined experimentee seating parameter data to the learning system,
   b) establishing by the learning system a correlation between the predetermined experimentee seating parameter data and the predetermined experimentee person parameter data relating to each experimentee,
   c) establishing by the learning system a learning algorithm derived from the correlation,
   d) detecting predetermined seating parameter data relating to a person which is not one of the experimentees sitting on a seating device of the same type as the test seating device by at least one sensor element of the seating device,
   e) transmitting the predetermined seating parameter data of the person to a processor of the seating device by the at least one sensor element of the seating device,
   f) determining, from the predetermined seating parameter data of the person, predetermined person parameter data relating to the person by means of the processor running the learning algorithm derived from the correlation established by the learning system, wherein the learning algorithm allows the processor to determine the predetermined person parameter data of the person without having to enter the predetermined person parameter data of the person into the processor beforehand,
   g) extracting control data, which are associated with the person parameter data of the person, from a memory unit by the processor, and
   h) controlling at least one electromechanical actuator on the basis of the control data by the processor,
   wherein the predetermined person parameter data relating to the person, which data are determined from the predetermined seating parameter data relating to the person, comprise data including at least one of proportions and sex of the person.

7. The method according to claim 6, wherein the at least one electromechanical actuator controls at least one position parameter of the seating device.

8. The method according to claim 6, wherein the seating device is an office chair.

9. The method according to claim 6, wherein the seating device comprises a plurality of sensor elements, which are arranged in a seat and/or a backrest of the seating device.

10. The method according to claim 6, wherein the processor is also designed to control settings of devices arranged in the area surrounding the seating device, wherein the devices are adapted to the person sitting on the seating device.

* * * * *